Patented Sept. 28, 1943

2,330,716

UNITED STATES PATENT OFFICE 2,330,716

GEOCHEMICAL PROSPECTING

Leo Horvitz, Houston, Tex., assignor to Esme E. Rosaire, Houston, Tex.

No Drawing. Application November 24, 1939, Serial No. 305,896

10 Claims. (Cl. 23—232)

The present invention relates to prospecting for oil, gas and related deposits, hereinafter referred to as carboniferous deposits, by earth sampling to determine the presence of hydrocarbons and other substances which leak or result from leakage from such deposits and which may serve as an indication of the proximity of the deposits.

In my co-pending application Ser. No. 304,141, filed November 13, 1939, I have described a method of prospecting for petroleum deposits by collecting soil samples and analyzing said samples for a selected inorganic constituent such as an inorganic ion or radical. In said application I have listed several inorganic constituents which have been found to be diagnostic and have described methods of analyzing soil samples for these constituents. To the extent to which the present application includes the analysis of soil samples for inorganic constituents, it is a continuation in part of said application Serial No. 304,141.

In my copending application Serial No. 263,669, I have disclosed my discovery that the various constituents of soil samples which are significant with respect to the presence of subterranean carboniferous deposits are often contained in oolites in the soil, these oolites being shell-like particles of calcium carbonate containing a core of one of the aforesaid constituents. In said application I have disclosed the treatment of soil samples with acids for the purpose of freeing such locked-up constituents. Insofar as the present application includes such a treatment of soil samples, it is a continuation in part of application Serial No. 263,669.

I have now found that these locked-up constituents can be freed by other methods, notably by heating to suitable temperatures and by treatment with chemicals other than acids.

In accordance with the present invention, soil samples are collected systematically over an area to be investigated at depths suitable for the detection of the particular constituent being investigated. For soil wax determinations these samples are preferably collected as close to the surface as possible, generally at a depth not exceeding a few inches. For the determination of gases, such as hydrocarbons and hydrogen, or of mineral salts, the samples are collected at greater depths, generally at a depth greater than four feet and, preferably at a depth between ten and twenty feet or greater.

According to one embodiment of the present invention, these samples are then individually confined in a closed chamber having a sealable connection with a gas collecting or analyzing apparatus. The sample in the container is then heated, preferably at reduced pressure to a temperature suitable for the decomposition of calcium carbonates, generally of the order of 1000° C. or greater. The heating is continued until no further gas is given off as indicated by the pressure in the gas collection apparatus. The gas so collected is then subjected to the well known treatment for the separation therefrom of carbon dioxide, and the residue is analyzed for hydrocarbons or hydrogen or carbon monoxide, as may be desired. This embodiment is not practiced on samples which are to be examined for their soil-wax content or for certain mineral constituents because the temperatures employed would destroy such components.

Another method for freeing constituents held in the samples by water insoluble carbonates is to mix the samples with a solution, preferably concentrated, of an ammonium salt of an acid, the calcium salts of which are water soluble, and allowing the mixture to stand until the calcium carbonates are disintegrated.

This period may be shortened by heating in which case ammonia and carbon dioxide are given off. When this latter method is applied to samples which are to be examined for gaseous constituents the treatment with ammonium salt is conducted in a closed chamber so that evolved gases can be collected for analysis. When the method is to be used in conjunction with an analysis for mineral constituents, it is important that the radical of the ammonium salt be different from the radical for which the sample is being examined. Ordinarily, ammonium chloride is used in this modification of the present invention. In general, this modification may be practiced by the use of any inorganic salt which is hydrolyzable to form an acid the calcium salt of which is water soluble.

Other treating agents which may be used on the samples of soil, particularly when the samples are to be analyzed for gaseous constituents, are wetting agents of various types, such as mineral oil sulfonic acids, alkylated naphthelene sulfonic acids, and similar materials. Alkalis also exhibit utility for this purpose. In fact, any chemical agent may be employed which serves to weaken the affinity between the gases and the minerals with which they are associated, presumably by reducing the surface tension of the mineral holding agent. The efficacy of the various other treating agents indicates that gaseous constituents are held in the soil not only by the presence of oolites, but because of physical affinity which is so great as not to be overcome by suction or moderate heating, such as has hitherto been proposed.

In connection with the treatment of soil samples with acid it may be mentioned here that where it is desired to examine the soil samples for their gaseous hydrocarbon content, it is sometimes preferable to treat the sample with an acid, such as phosphoric or boric or any other acid which does not have the property of decomposing nitrates, instead of hydrochloric acid which will decompose any nitrates present, liberating nitrogen oxide which introduces an error when certain types of analyses are employed.

It will be understood that in any case where it is intended to examine soil samples for content of normally gaseous hydrocarbons, it is desirable to first subject the samples to such treatment as have been found useful for the removal of interstitial air, such as, for example, suction to a vacuum of about $\frac{1}{7}$ of an atmosphere. The gas so recovered is discarded. The sample is then subjected to one of the aforesaid treatments for removing the more tightly-bound gas. When a chemical agent is employed for this purpose, the simultaneous application of reduced pressure and heat to a moderate temperature, for example, to about 100° C., will improved the results.

Other methods for liberating tightly-bound gas and for freeing the locked-up constituents from calcium carbonate will occur to those skilled in the art. Such other methods are contemplated within the scope of the present invention which is not limited to the precise methods outlined above, but is directed broadly to the treatment of samples of soil in such a way as to liberate gas, if this is to be examined, which is not recoverable by suction and moderate heating, and/or to destroy the physical structure of water insoluble carbonate bodies contained therein, either by decomposing them to free carbon dioxide, or by rendering them water soluble as a step in geochemical prospecting by collecting soil samples and analyzing them for constituents significant of the existence of subsurface deposits of carboniferous materials.

The nature and objects of the present invention having been thus described, what is claimed as new and useful and is desired to be secured by Letters Patent is:

1. In geochemical prospecting for subsurface carboniferous deposits the steps which comprise collecting samples of soil in a region to be explored, subjecting each sample to a treatment suitable for altering the physical structure of water insoluble carbonates contained therein in such a way as to disengage from said carbonates any constituents associated therewith, recovering from the soil sample a constituent significant of the existence of a subsurface carboniferous deposit, other than a carbonate, or a product of its dissociation, and determining the quantity of said constituent.

2. In geochemical prospecting for subsurface carboniferous deposits the steps which comprise collecting samples of soil in a region to be explored, subjecting each sample to the action of a chemical capable of solubilizing water insoluble carbonates, recovering from the soil samples a constituent significant of the existence of subsurface carboniferous deposits, other than a carbonate, or a product of its dissociation, or the treating chemical, and determining the quantity of such constituent.

3. In geochemical prospecting for subsurface carboniferous deposits the steps which comprise collecting samples of soil in a region to be explored, subjecting each sample to heat at a temperature sufficiently high to decompose carbonates to thereby liberate from the soil any constituent thereof which is associated with carbonates in oolitic form, recovering from the sample a constituent significant of the existence of a subsurface carboniferous deposit, other than a carbonate, or a product of its dissociation, and determining the quantity of such constituent.

4. In geochemical prospecting for subsurface carboniferous deposits the steps which comprise collecting samples of soil in a region to be explored, subjecting each sample to a treatment suitable for liberating therefrom normally gaseous constituents which are so intimately associated with the soil as not to be recoverable therefrom by the application of suction and moderate heat, and quantitatively analyzing the gases so liberated for a constituent significant of the existence of a subsurface carboniferous deposit.

5. In geochemical prospecting for subsurface carboniferous deposits the steps which comprise collecting samples of soil in a region to be explored, subjecting each sample to suction for the removal therefrom of interstitial gas, discarding the gas so recovered, treating the sample with a chemical capable of liberating therefrom gases so intimately associated therewith as not to be recoverable by the application of suction and moderate heat, and quantitatively analyzing the gases so liberated for a constituent significant of the existence of subsurface carboniferous deposits.

6. A method according to claim 5 in which the treatment with the chemical agent is accompanied by the application of suction and moderate heating.

7. A method according to claim 5 in which the chemical treating agent is an inorganic acid which does not decompose nitrates.

8. A method according to claim 1 in which the constituent recovered from the soil sample is an inorganic ion.

9. A method according to claim 3 in which the constituent recovered is a normally gaseous hydrocarbon heavier than methane.

10. A method according to claim 5 in which the chemical treating agent is phosphoric acid.

LEO HORVITZ.